(12) United States Patent
Mirsky et al.

(10) Patent No.: US 9,755,958 B2
(45) Date of Patent: Sep. 5, 2017

(54) FAST CONVERGENCE IN VRRP WITH MULTIPOINT BIDIRECTIONAL FORWARDING DETECTION

(71) Applicant: Telefonaktiebolaget L M Ericsson (publ), Stockholm (SE)

(72) Inventors: Gregory Mirsky, Pleasanton, CA (US); Evgeny Tantsura, Palo Alto, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 133 days.

(21) Appl. No.: 14/846,580

(22) Filed: Sep. 4, 2015

(65) Prior Publication Data
US 2017/0005915 A1    Jan. 5, 2017

Related U.S. Application Data

(60) Provisional application No. 62/188,433, filed on Jul. 2, 2015.

(51) Int. Cl.
| | |
|---|---|
| H04L 12/713 | (2013.01) |
| H04L 29/14 | (2006.01) |
| H04L 12/703 | (2013.01) |
| H04L 12/761 | (2013.01) |
| H04L 12/721 | (2013.01) |

(52) U.S. Cl.
CPC ............ H04L 45/28 (2013.01); H04L 45/16 (2013.01); H04L 45/26 (2013.01); H04L 45/586 (2013.01); H04L 69/40 (2013.01)

(58) Field of Classification Search
CPC ........ H04L 45/586; H04L 41/06–41/14; H04L 69/40
See application file for complete search history.

(56) References Cited

U.S. PATENT DOCUMENTS

| | | | |
|---|---|---|---|
| 2015/0009819 A1* | 1/2015 | Mori | H04L 47/12 370/232 |
| 2016/0080249 A1* | 3/2016 | Lu | H04L 45/28 370/219 |
| 2016/0197853 A1* | 7/2016 | Kumar | H04L 45/02 370/389 |

OTHER PUBLICATIONS

N. Gupta et al., "Fast failure detection using peer learning in VRRP with BFD; draft-nitish-vrrp-bfd-01", Network Working Group, Jun. 25, 2015, pp. 1-18.

(Continued)

*Primary Examiner* — Marcus R Smith
(74) *Attorney, Agent, or Firm* — Nicholson De Vos Webster & Elliott LLP

(57) ABSTRACT

A method implemented by a first network device of enabling detection of a failure of a network device acting as a master of a virtual router redundancy protocol (VRRP) group of network devices is disclosed. The method comprises determining whether a first priority associated with the first network device is the highest priority when it is compared with priorities respectively associated with other network devices of the VRRP group. Responsive to determining that the first priority of the first network device is the highest priority, the method continues with causing the first network device to assume a master role in the VRRP group, and establishing a multipoint bidirectional forwarding detection (BFD) head session, wherein the BFD head session indicates that the first network device is action as a head of a multipoint BFD tree.

15 Claims, 6 Drawing Sheets

(56) References Cited

OTHER PUBLICATIONS

D. Katz et al., "BFD for Multipoint Networks; draft-ietf-bfd-multipoint-06", Internet Engineering Task Force, May 6, 2015, pp. 1-17.

* cited by examiner

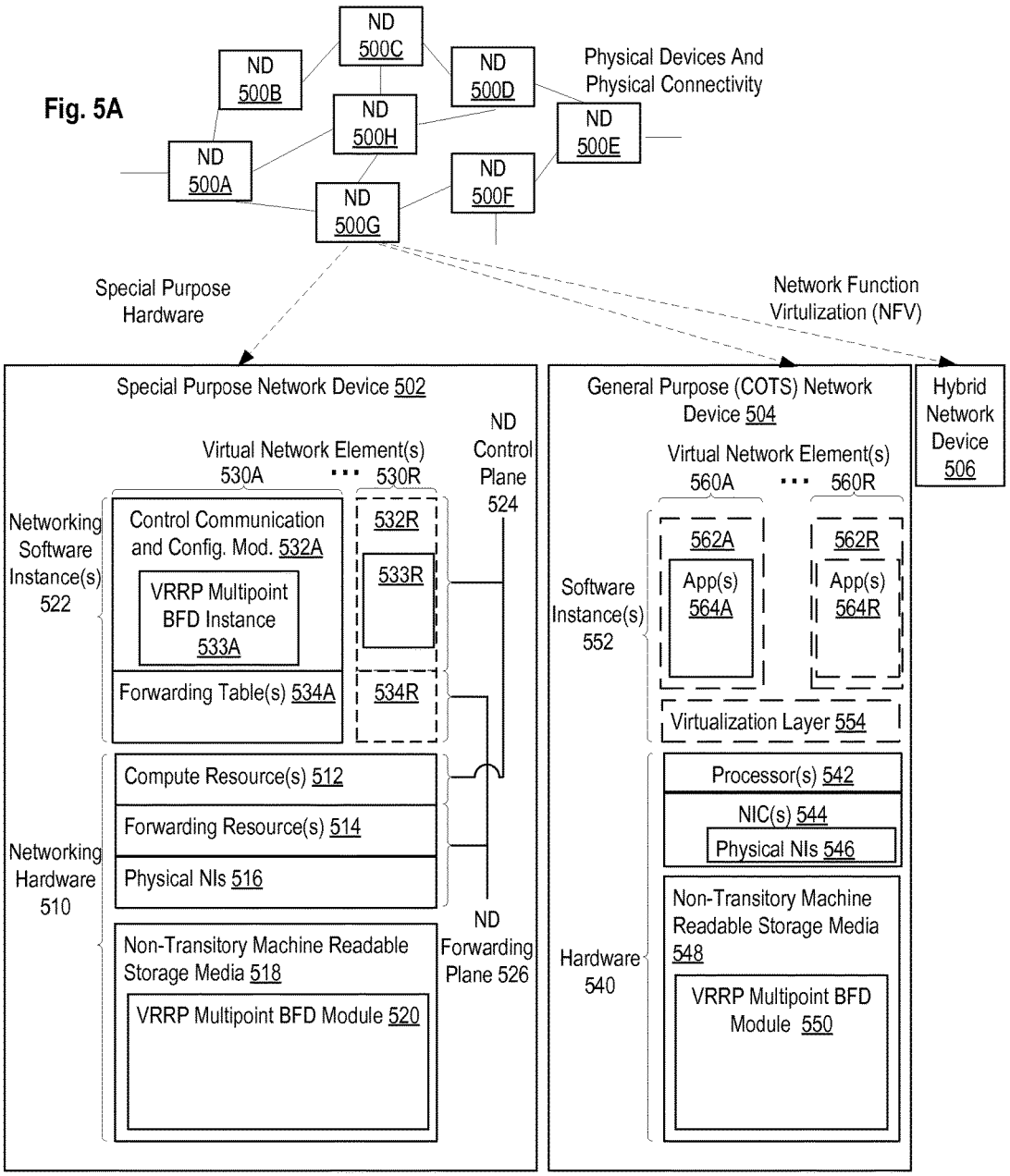

FAST CONVERGENCE IN VRRP WITH MULTIPOINT BIDIRECTIONAL FORWARDING DETECTION

CROSS-REFERENCE TO RELATED APPLICATIONS

This application claims the benefit of U.S. Provisional Application No. 62/188,433, filed on Jul. 2, 2015, which is hereby incorporated by reference.

FIELD

Embodiments of the invention relate to the field of packet networks; and more specifically, to the detection of failure of a network device acting as a master of a VRRP group.

BACKGROUND

A Virtual Router Redundancy Protocol (VRRP) network element (e.g., a VRRP router), is a collection of physical network devices that support the VRRP protocol. A VRRP virtual instance includes one physical network device operating as the master network device of the VRRP virtual network element and one or more other physical network devices operating as backup network devices of the VRRP virtual network element. In a VRRP group (i.e., VRRP network element), only the master device is enabled to accept subscriber traffic and forward it to an external network such as the Internet. Subscriber traffic directed at any of the backup devices is discarded.

A master network device is selected among the physical network devices in the VRRP instance based on priorities assigned to the physical devices. When a physical network device switches state from being a backup network device to a master network device, the master network device is required to send gratuitous Address Resolution Protocol (ARP) messages to notify the subscriber circuits of its virtual Media Access Control (MAC) address and virtual Internet Protocol (IP) address of the VRRP virtual device. The gratuitous ARP messages cause the subscriber circuits to update their bridging tables. The updated bridging tables cause subscriber traffic to be properly routed to the master network device instead of a backup router. In addition, a master network device periodically sends VRRP Advertisement (Ad) messages to all backup network devices of the VRRP virtual group notifying the backup network devices of the master device running status.

When the master device or any one of its links fail, the master network device (router) switches to being a backup network device. A new master network device is then selected based on priorities as discussed above. The new master network device sends gratuitous ARP messages to the subscriber circuits, causing traffic to be directed to the new master device, instead of the "original" master device.

SUMMARY

A method implemented by a first network device of enabling detection of a failure of a network device acting as a master of a virtual router redundancy protocol (VRRP) group of network devices, where the first network device is associated with a first priority is disclosed. The method comprises receiving a priority associated with each network device of the VRRP group; determining whether the first priority is the highest priority when the first priority is compared with priorities of other network devices of the VRRP group. The method continues with responsive to determining that the first priority of the first network device is the highest priority, performing the following operations: assuming a master role in the VRRP group, and establishing a multipoint bidirectional forwarding detection (BFD) head session, wherein the BFD head session indicates that the first network device is acting as a head of a multipoint BFD tree, and the other network devices of the VRRP group act as tails of the multipoint BFD tree.

A network device to enable detection of a failure of a virtual router redundancy protocol (VRRP) master network device of a VRRP group is disclosed. The network device comprises a non-transitory machine-readable storage medium configured to store a VRRP multipoint bidirectional forwarding detection (BFD) module; and a network processor communicatively coupled to the non-transitory machine-readable storage medium, the network processor operative to execute the VRRP multipoint BFD module. The VRRP multipoint BFD module is operative to receive a priority associated with each network device of the VRRP group, and determine whether a priority associated with the network device is the highest priority when the priority is compared with priorities of other network devices of the VRRP group. In response to determining that the priority of the network device is the highest priority, the VRRP multipoint BFD module is further operative to cause the network device to assume a master role in the VRRP group, and establish a multipoint bidirectional forwarding detection (BFD) head session, wherein the BFD head session indicates that the network device is acting as a head of a multipoint BFD tree, and the other network devices of the VRRP group act as tails of the multipoint BFD tree.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement a special-purpose network device according to some embodiments of the invention.

DESCRIPTION OF EMBODIMENTS

Figure 1:
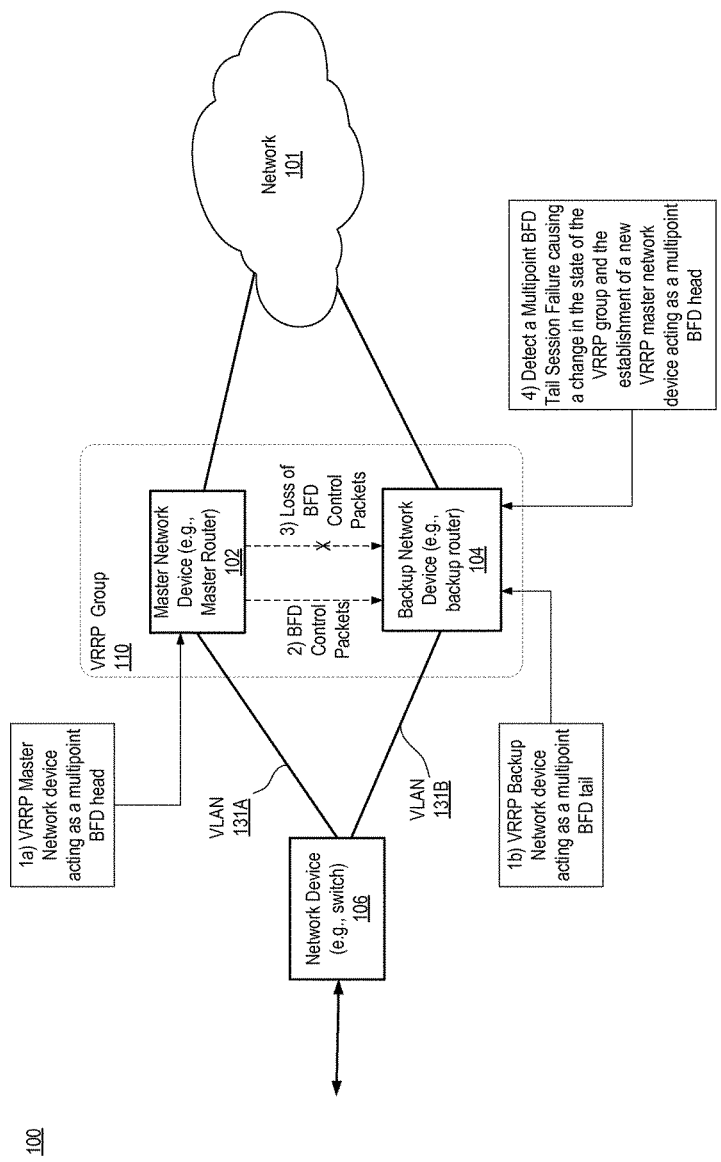
FIG. 1 is a block diagram illustrating a network 100 for exchanging network traffic between a network device network and a VRRP virtual router in accordance with some embodiments of the invention.

The following description describes methods and apparatus for enabling detection of a failure of a network device acting as a master of a VRRP group. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview:

In a virtual network, subscriber circuits are created to transport subscriber traffic between an access network and a virtual router, i.e., a gateway supporting VRRP. A subscriber circuit is a distinguishable flow of packets communicated between one network device and a subscriber end station. The subscriber circuit may be created by using a protocol such as the 802.1Q Virtual Local Access Network (VLAN) protocol. A VRRP virtual network element (or VRRP group) is a group/collection of physical network devices (e.g., routers) that collectively act as a single network device (e.g., as a single router) where each device supports the VRRP protocol. A VRRP virtual network element, although comprising multiple physical devices, operates as if it is a single device from the perspective of other network devices communicatively coupled to it. Although a VRRP virtual network element includes multiple physical routers, during operation, only one physical network device is enabled to accept network traffic for the Internet Protocol (IP) addresses that the VRRP group is associated with; this physical device is referred to as the master network device (or master router) of the VRRP virtual network element. All other physical network devices of the VRRP group act as backup network devices of the VRRP group, which shall herein be referred to simply as backup devices or alternatively as backup routers; these backup routers are not enabled to accept network traffic.

The VRRP group "looks" like a single network device because it is assigned a single virtual Media Access Control (MAC) address, regardless of which physical device is currently acting as the current master router. In a VRRP group supporting VRRP for IPv4, the VRRP virtual router uses 00-00-5E-00-01-XX as its MAC address, where the last byte of the virtual MAC address (i.e., XX) is the Virtual Router Identifier (VRID). In a VRRP virtual router supporting VRRP for IPv6, the VRRP group uses 00-00-5E-00-02-XX as its MAC address, where the last byte of the virtual MAC address (i.e., XX) is the Virtual Router Identifier (VRID). Thus, the VRID uniquely identifies a VRRP virtual router (or VRRP group) in a network that includes multiple VRRP virtual routers. A physical router may be part of multiple VRRP virtual routers, and as such, needs a way to identify network traffic based on VRIDs.

A VRRP circuit is created for each VRRP router so that the physical routers of the VRRP router can perform various functions, e.g., electing a master router and inform one another of the functional status. A VRRP circuit may be implemented over a VLAN where all the physical routers are communicatively coupled. The election of a master router is performed based on priorities that have been assigned to each physical router. The priorities range from 0-255, 255 being the highest priority. The master router periodically transmits VRRP Advertisement messages to all backup routers on the VRRP circuit (i.e., over the VLAN over which the VRRP circuit is implemented). These VRRP Advertisement messages serve as "heartbeats" informing the backup routers that the master router is functioning properly.

When an original master router fails to function properly, it "switches role" and becomes a current backup router. A new physical router is then elected to become the current master router based on its priority. Under the VRRP protocol, whenever a backup router transitions to being a master router, it transmits a gratuitous Address Resolution Protocol (ARP) message to each of the VLANs (i.e., subscriber circuits) that have been configured to track and follow the VRRP circuit. Only this "new" master router is required to transmit the gratuitous ARP messages. The gratuitous ARP contains the virtual MAC address of the VRRP virtual router and all the IP addresses that the VRRP virtual router is associated with. By sending gratuitous ARP messages, the current (i.e., new) master router causes all the subscriber circuits tracking and following the VRRP circuit to be directed to the current master router, instead of being directed to the original master router which has become faulty.

A VRRP virtual router is intended to eliminate the single point of failure that is inherent in the static default routing environment and provides higher availability default path without requiring the configuration of dynamic routing or router discovery protocols on every end host. In other words, when one router fails, VRRP automatically redirects traffic to another router, as described above. Consequently, the fast detection of a failure of the master network device in a VRRP group is crucial to the efficiency and reliability of a VRRP virtual router.

The Internet Engineering Task Force (IETF) request for comments (RFC) 5798 entitled "Virtual Router Redundancy Protocol (VRRP) Version 3 for IPv4 and IPv6" introduces VRRP version 3 which has the ability to operate in IPv4 and IPv6 networks while enabling transmission of VRRP Advertisement messages with sub-second interval. This approach, as described in RFC 5798, allows for sub-second detection of VRRP master failure by performing sub-seconds generation of VRRP Advertisement packets. However the excessive generation of VRRP Ad packets may result in the packets being queued for a long period before being processed by the VRRP Backup router(s). If the queue of Ad packets grows too long, the processing of the VRRP Advertisement messages may be delayed long enough for the Master_Down_Interval to expire and a detection of a master failure to occur. As a result, a new VRRP master router may start advertising itself. However, by that time Ad messages previously queued for the first master router may be processed causing another re-convergence and a switch back to the first master router.

Another approach proposes the use of point-to-point Bidirectional Forwarding Detection (BFD) as defined for Internet Protocol (IP) networks, in IETF RFC 5880, entitled "Bidirectional Forwarding Detection (BFD) for IPv4 and IPv6 (Single Hop)," and the IETF RFC 5883 entitled "Bidirectional Forwarding Detection (BFD) for Multihop Paths" for detecting failure of the master router of a VRRP group. However, the use of point-to-point BFD requires the modification of the VRRP protocol as defined in the IETF RFC 5798, and the need to advertise the identities of all the VRRP Backup routers of the given VRRP Group. Following the transmission of these advertisements, a VRRP table is constructed based on these advertisements in the given Virtual Router ID (VRID). All routers of the VRRP group form a mesh of BFD sessions between the master router and the backup routers. In this approach, the master router as well as the backup routers are caused to monitor the state of the backup routers and the master router respectively. However, this approach loads and strains the master router and may cause congestion in the network as each backup router transmits its BFD packets at a high rate.

The embodiments of the invention provide a system and method to overcome the limitations of the prior approaches described above, and for enabling a fast and reliable detection of a failure of a VRRP master router. The embodiments of the invention enable a quick switch of a master VRRP router in a VRRP group without the need to change the virtual router redundancy protocol as defined in the IETF RFC 5798 (entitled "Virtual Router Redundancy Protocol (VRRP) Version 3 for IPv4 and IPv6,") and without having the master router monitoring the state changes of the backup router(s) within the VRRP group. The embodiments of the invention further provide an expedited detection of a failure of a master router with the use of multipoint bidirectional forwarding detection. The detection of the failure of the master router is simplified by the use of multipoint BFD sessions instead of a mesh of point to point BFD sessions.

The embodiments of the invention provide the efficient and scalable mechanism for a fast-converging environment that uses default route rather than dynamic routing with the use of point to multipoint bidirectional forwarding detection (or as referred herein below as "multipoint BFD"). Each redundancy (VRRP) group presents itself as multipoint BFD session with its master router being the root/head of the BFD tree and the backup routers being tails of the multipoint BFD tree. The master router starts transmitting BFD control packets with VRID as a source IP address. The backup routers demultiplex multipoint BFD test sessions based on the VRID that it has been configured with. Once the backup router accepts the multipoint session from the new master router, the backup router may use My Discriminator received from multipoint BFD control packet to demultiplex multipoint BFD sessions. When a backup router detects failure of the master router it re-evaluates its role in the VRRP group identified by the VRID. As a result, the backup router may become the master router of the given VRRP group or may continue to act as a backup router. If the former is the case, then the new master router selects My Discriminator and starts transmitting multipoint BFD control packets using the master IP address as the source IP address for multipoint BFD control packets. If the latter is the case, then the backup router waits for multipoint BFD control packet with source IP address set to VRID.

In the embodiments, a first network device receives a priority associated with each network device of the VRRP group, and determines its priority is the highest priority when compared with the received priorities. If the network device determines that it has the highest priority, it assumes a master role in the VRRP group and establishes a multipoint bidirectional forwarding detection head session, where the BFD head session indicates that the network device is acting as a head of a multipoint BFD tree and the other network devices of the VRRP group act as tails of the multipoint BFD tree. Following the establishment of the BFD head session, the network device periodically transmits multipoint BFD control packets which are to be received by the other devices of the VRRO group that act as backup network devices.

In some embodiments, when the network device determines that it does not have the highest priority, it assumes a backup role in the VRRP group and establishes a multipoint bidirectional forwarding detection tail session, where the BFD tail session indicates that the network device is acting as a tail of a multipoint BFD tree. Following the establishment of the BFD tail session, the network device listens to multipoint BFD control packets which are to be transmitted by another network device acting as the master network device in the VRRO group. Upon detection of failure of BFD tail sessions running on one or more VRRP backup devices, a switch is performed in the state of the VRRP group and a new VRRP master device is set based on the priorities associated with the devices in the VRRP group.

FIG. 1 is a block diagram illustrating a network 100 for exchanging network traffic between a network device and a VRRP virtual router in accordance with some embodiments. The following description assumes that a subscriber circuit has been implemented over VLAN 131A-131B. Throughout the description, the subscriber circuit and VLAN 131A-131B may be used synonymously. It is further assumed that VLAN 131A-131B has been configured to track and follow the VRRP group (or VRRP monitor circuit). The VRRP group 110 is an IP layer implemented over a VLAN.

Network 100 comprises a network device 106 communicatively coupled to a master network device 102 and a backup network device 104 from a VRRP group 110. In some embodiments, the network device 106 is a switch of an access network coupled with routers 102, and 104 which are configured to act as an original master and original backup VRRP routers respectively. In some embodiments, the network device 106 may be coupled with the master network device 102 and the backup network device 104 through intermediate network devices (not shown) such as switches. As illustrated in FIG. 1, VRRP group 110 has been created between network device 102 and network device 104. VRRP circuit is implemented over VLAN which includes links 131A-131B. The master network device and the backup network device are further coupled to the network 101 (e.g., an IP network). While embodiments of the invention are described in relation to a VRRP group including a master network device and a single backup device as illustrated in FIG. 1, other embodiments may include more network devices in the VRRP group acting as backup devices. Therefore, embodiments of the invention are not limited to having a master network device and a single backup network device in a VRRP group.

As illustrated in FIG. 1, a subscriber circuit has been created between the network device 106 and the virtual router 110 (i.e., the VRRP group). In some embodiments, the subscriber circuit is created using the IEEE 802.1Q Virtual Local Access Network (VLAN) protocol. When network device 102 is acting as the current master router, the subscriber circuit is configured to direct subscriber traffic to network device 102. This configuration may be done, for example, by network device 102 transmitting a gratuitous ARP message to the subscriber circuit.

At (1a), the network device 102 operates as a current master network device of a VRRP group. In some embodiments, the network device 102 has the highest priority of the network devices from the VRRP group. In other embodiments, the network device 102 has the highest priority from a subset of network devices from the VRRP group, where this subset includes all still active network devices of the VRRP group. In some embodiments, the network device 102 assumes the role of the master network device of the VRRP group following the receipt of the priorities of all active network devices of the VRRP group and determining that its associated priority is the highest priority in the priorities associated with the other network devices of the group.

Once the network device 102 takes on the role of the master network device (e.g., a master router), it initiates a multipoint BFD head session. The BFD head session indicates that the network device 102 acts as a head of a multipoint BFD tree, while the other network devices of the VRRP group (e.g., the backup network device 104 in the illustrated embodiment) act as tails of the multipoint BFD tree. In some embodiments, the association between the role of master router and multipoint BFD head session will enable a fast and reliable detection of the failure of the master network device through the use of the multipoint BFD protocol.

At (1b), the network device 104 operates as a current backup network device of the VRRP group 110. In some embodiments, the network device 104 does not have the highest priority of the network devices from the VRRP group. In other embodiments, the network device 104 has the highest priority of the network devices from the VRRP group, however the network device 104 had previously failed and another device (e.g., network device 102) had assumed the role of master device prior to the recovery of the network device 104.

In some embodiments, the network device 104 assumes the role of VRRP backup network device following the receipt of the priorities of all active network devices of the VRRP group and determining that its associated priority is not the highest priority in the priorities associated with the other network devices of the group.

Once the network device 104 takes on the role of the backup network device (e.g., a backup router), it initiates a multipoint BFD tail session. The BFD tail session indicates that the network device 104 is configured to act as a tail of a multipoint BFD tree. In some embodiments, the multipoint BFD session on the tail is established dynamically, based on the receipt of a multipoint BFD control packet from the head (e.g., VRRP master network device 102), and is of type MultipointTail. In the embodiments that will be described in further detail below, the association between the role of backup router and multipoint BFD tail session will enable a fast and reliable detection of the failure of the master network device through the use of the multipoint BFD protocol.

At (2), network device 102 transmits BFD control packets over a broadcast segment (i.e., the VRRP circuit implemented over the VLAN). The BFD control packets arrive at the network device 104 and any other backup network devices that may be included in the VRRP group through this broadcast segment. These BFD control packets inform network device 104 that network device 102 is properly functioning as a head of a multipoint BFD tree and consequently that it is properly functioning as a master router of the VRRP group due to the link established between the VRRP group and the BFD sessions. The network device 106 (e.g., switch) directs subscriber traffic (e.g., which may originate from an access network not illustrated in FIG. 1) towards the master network device 102. The subscriber traffic is accepted by network device 102 since it is the current master router. While in FIG. 1, a direct link illustrates that the master network device 102 is coupled with the backup network device and that BFD control packets are transmitted and received over this link, one would understand that this is a logical representation of the communication of the BFD control packets and does not imply that there is a physical direct connection between the master and the backup device. As described earlier, the BFD control packets are sent over a broadcast segment to be received by the backup network device(s) of the VRRP group.

At (3), after a failure occurs at the master network device 102, the backup network device 104 fails to receive BFD control packets for a period of time causing the failure of its BFD tail session. When the multipoint BFD tail session fails, it means that the BFD tail (i.e., the VRRP backup network device 104) has lost contact with the BFD head (i.e., VRRP master network device) or alternatively that the head has been administratively disabled. In the present embodiments, as a VRRP master network device is associated and directly linked with a BFD head session, a failure detected at a tail of the BFD tree necessarily indicates the failure of the VRRP master network device and that the state of the VRRP group should be updated to designate a new master network device.

At (4), the backup network device 104 detects a failure of its multipoint BFD tail session causing a change in the state of the VRRP group and the establishment of a new VRRP master network device. In some embodiments, the backup network device upon detection of a failure of its BFD tail session is operative to change its VRRP state and switch to a state of a master VRRP. Upon transitioning to being the current master router, network device 104 transmits gratuitous ARP message to all VLANs tracking and following VRRP group 110. As illustrated, VLAN 131A-131B is tracking and following VRRP circuit. For example, a gratuitous ARP message is transmitted over VLAN 131A, and arrives at the network device 106. These gratuitous ARP messages from network device 104 cause any switches (located within the VLAN, such as for example network device 106) to update their bridging tables such that the subscriber circuit is redirected to network device 104. Thus, after the gratuitous ARP is sent out by network device 104, the subscriber circuit is directed to network device 104 over VLAN 131B. In addition to transitioning to a master VRRP network device, the network device 104 initiates a new BFD head session, in which the network device 104 acts as the head of BFD tree that links the network devices of the VRRP group.

Alternatively, in other embodiments, the network device 104 is one of a plurality of backup network devices from the VRRP group and upon detection of the failure of its multipoint BFD tail session, it does not change its state and remain a backup VRRP network device. In these embodiments, another backup device (e.g., a device with a priority higher than the network device 104) assumes the role of the new master network device. In these embodiments, even if the backup device 104 remains a backup VRRP network device in the VRRP group, it establishes a new multipoint BFD tail session associated with the identity of the new master VRRP network device of the group. The network device 104 is operative to receive and monitor BFD control packets received from the new master VRRP network device which also acts as the new multipoint BFD head of the BFD tree.

In some embodiments, when the failure is resolved (i.e., the original master router 102 recovers), the network device 102 rejoins the VRRP group and, according to VRRP, assumes the role of a backup network device since the group already has a designated master network device (e.g., network device 104) even though the priority of network device 102 is higher than that of network device 104.

As described above, when a failure occurs at the current master router (e.g., network device 102), the subscriber circuit is properly directed to a new current master router (e.g., network device 104) because the new current master router is able to detect the failure and transmit one or more gratuitous ARP messages upon detection that the BFD tail session associated with the head network device (which is also the master VRRP network device 102) has failed. Thus by associating the master VRRP router with a BFD head session and the backup VRRP routers with BFD tail sessions, the method provides a mechanism for expediting the detection of the failure of master VRRP devices in VRRP. Further, the detection is simplified by the use of point to multipoint BFD (or as referred herein "multipoint BFD") sessions instead of a mesh of point to point BFD sessions. In addition, only the backup routers are configured to listen and monitor receipt of BFD control packets.

Figure 2:
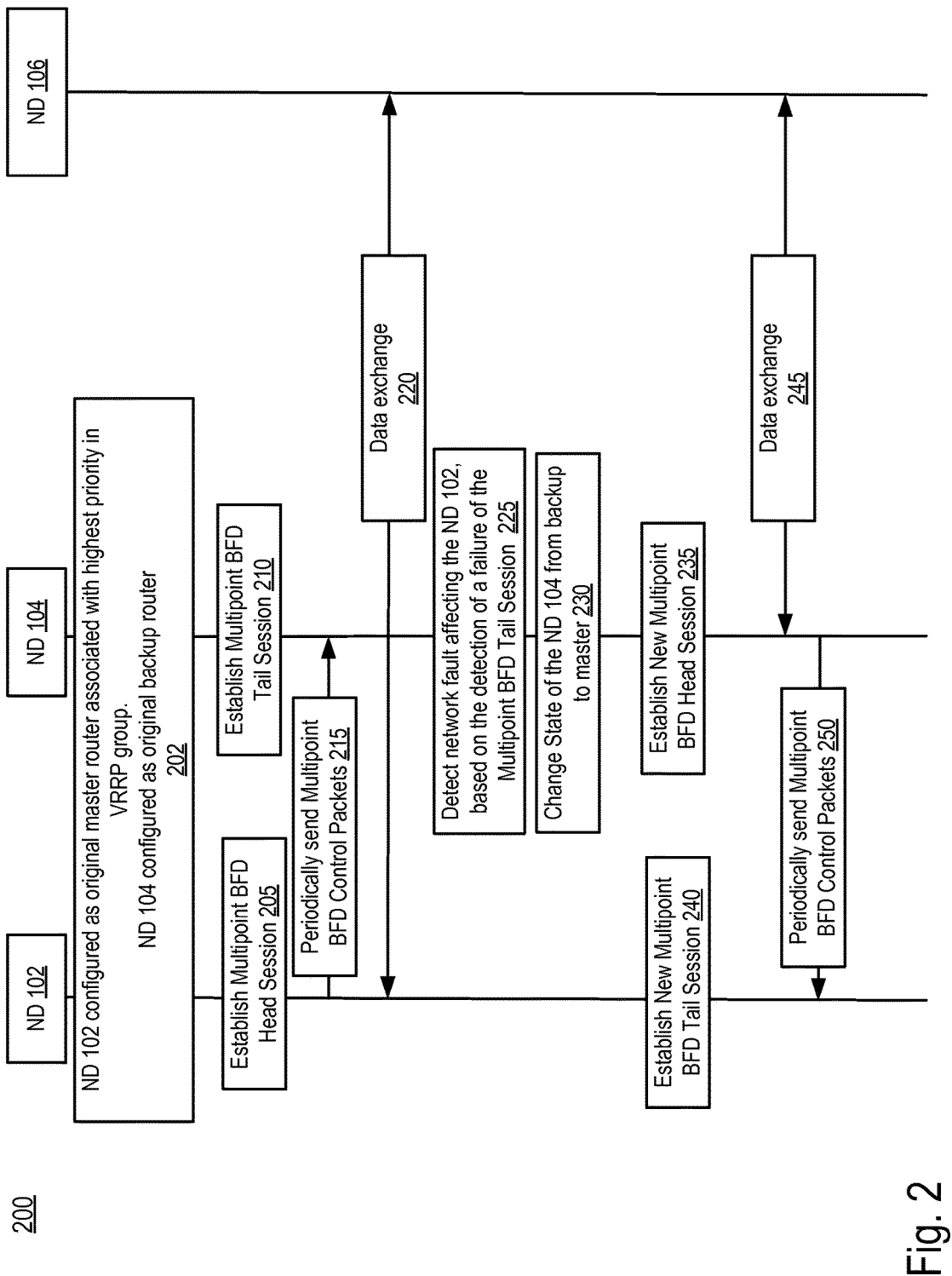
FIG. 2 illustrates a block diagram of operations 200 performed by network devices of a VRRP group to enable a fast detection of a failure of a master network device of the VRRP group, according to some embodiments of the invention.

FIG. 2 illustrates a block diagram of operations 200 performed by network devices of a VRRP group to enable a fast detection of a failure of a master network device of the VRRP group, according to some embodiments.

The operations in FIG. 2 will be described with reference to the exemplary embodiments of FIG. 1. However, it should be understood that the operations of FIG. 2 can be performed by embodiments of the invention other than those discussed with reference to FIG. 1, and the embodiments of the invention discussed with reference to FIG. 1 can perform operations different than those discussed with reference to FIG. 2.

At block 202, the network device (ND) 102 is configured to operate as an original master router, while the network device 104 is configured to operate as an original backup router in the VRRP group. At block 205, ND 102 establishes a multipoint BFD head session as a result of its master status in the VRRP group. The network device 102 is thus configured to transmit BFD control messages based on the multipoint BFD head session, the control messages having the IP address of the master router as source IP address and a discriminator (i.e., My Discriminator) set to a value bound to the multipoint path (i.e., the IP address of the master network device 102), and with "Your Discriminator" set to zero. The BFD head session is established as soon as ND 102 is configured to be the master router of the VRRP group.

At block 210, ND 104 establishes a multipoint BFD tail session as a result of its backup status in the VRRP group. The network device 104 is thus configured to listen to BFD control messages based on the multipoint BFD tail session, the control messages having the IP address of the master router a source IP address and a discriminator (i.e., My Discriminator) set to a value bound to the multipoint path (i.e., the IP address of the master network device 102), and with "Your Discriminator" set to zero. In some embodiments, the BFD tail session is established as soon as ND 104 is configured to be a backup master router in the VRRP group and upon receipt of the identity of the master network device. In some embodiments the identity of the master network device is determined based on the receipt of VRRP Advertisement (Ad) messages from the master network device 102. In other embodiments, the multipoint BFD session on the tail is established dynamically, based on the receipt of a multipoint BFD control packet from the head (e.g., from ND 102).

At block 215, ND 102 periodically sends multipoint BFD control packets to indicate its status to other network devices of the VRRP group. The BFD control packets arrive at the network device 104 and any other backup network device that may be included in the VRRP group through a broadcast segment. These BFD control packets inform network device 104 that network device 102 is properly functioning as a head of a multipoint BFD tree and consequently that it is properly functioning as a master router of the VRRP group due to the link established between the VRRP group and the BFD sessions.

At block 220, a data exchange occurs between the network device 106 and the master ND 102. During this data exchange, the network device 106 (e.g., switch) directs subscriber traffic (e.g., which may originate from an access network not illustrated in FIG. 1) towards the master network device 102. The subscriber traffic is accepted by network device 102 since it is the current master router. At block 225, ND 104 detects a network fault affecting the ND 102 based on the detection of a failure of the multipoint tail session of the ND 104. In some embodiments, the flow moves to block 230, at which the state of ND 104 is changed from backup to master in the VRRP group based on the detection performed at block 230 of the failure of the master network device 102.

At block 235, ND 104, acting as a master VRRP router establishes a new multipoint BFD head session while the other network devices of the VRRP group (e.g., ND 102 upon its recovery) establish a new multipoint BFD tail session identified by having the ND 104 acting as the head of the BFD tree and as a master of the VRRP group.

At block 245, data exchange occurs between the network device 106 and the new master ND 104. During this data exchange, the network device 106 (e.g., switch) directs subscriber traffic (e.g., which may originate from an access network not illustrated in FIG. 2) towards the master network device 104 instead of the previous master network 102. The subscriber traffic is accepted by network device 104 since it is the current master router.

At block 250, ND 104 periodically sends multipoint BFD control packets to indicate its status to other network devices of the VRRP group. The BFD control packets arrive at the network device 102 and any other backup network device that may be included in the VRRP group through a broadcast segment. These BFD control packets inform network device 102 that network device 104 is properly functioning as a head of a multipoint BFD tree and consequently that it is properly functioning as a master router of the VRRP group due to the link established between the VRRP group and the BFD sessions.

Figure 3:
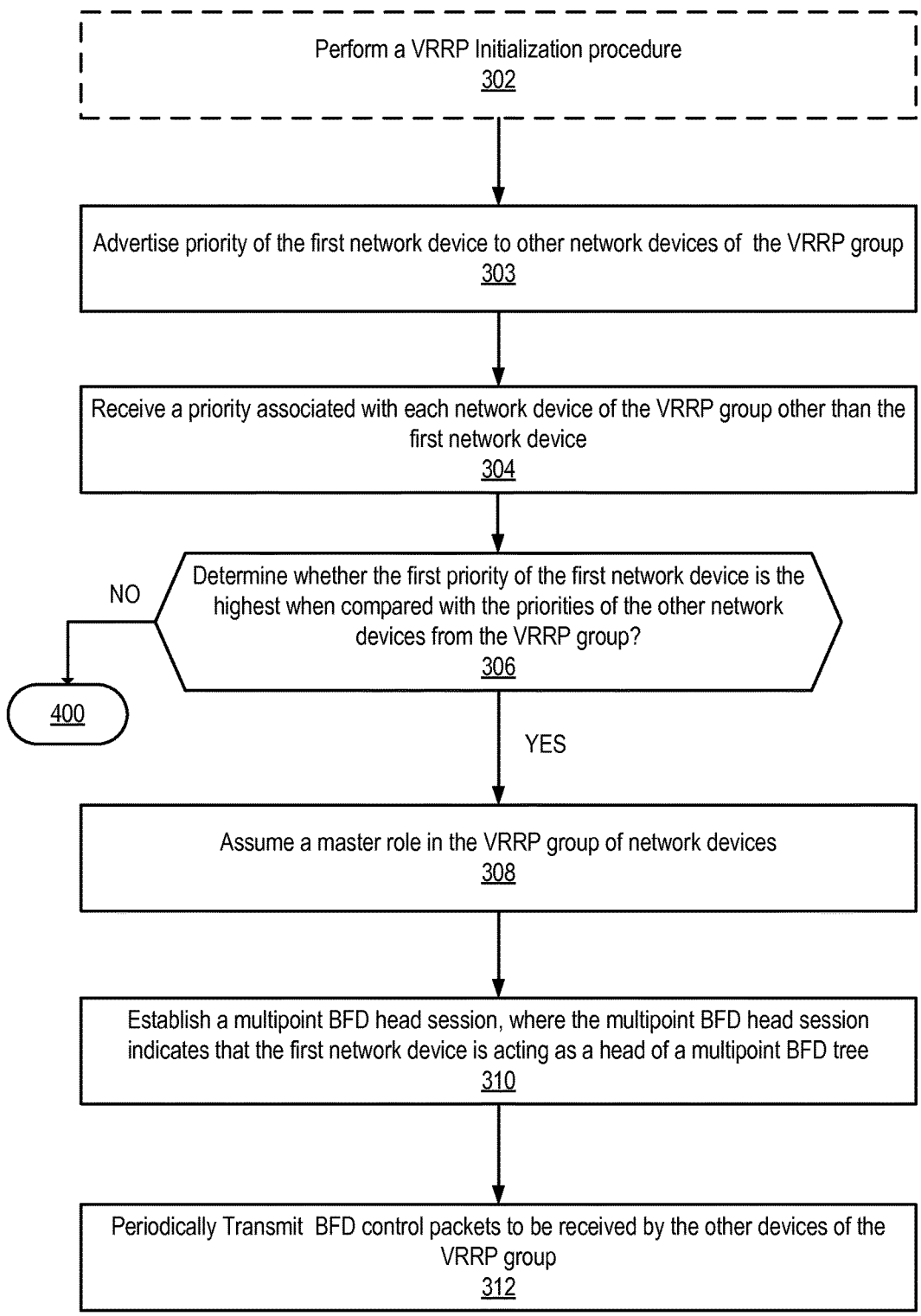
FIG. 3 illustrates a flow diagram of operations performed by a network device being configured to act as a master network device of a VRRP group in accordance with some embodiments of the invention.

FIG. 3, illustrates a flow diagram of operations performed by a network device being configured to act as a master network device of a VRRP group in accordance with some embodiments. The operations in FIG. 3 will be described with reference to the exemplary embodiments of FIG. 1. However, it should be understood that the operations of FIG. 3 can be performed by embodiments of the invention other than those discussed with reference to FIG. 1, and the embodiments of the invention discussed with reference to FIG. 1 can perform operations different than those discussed with reference to FIG. 3.

At block 302, a VRRP initialization is performed. During the initialization operation, a VRRP circuit is created for the VRRP router so that the physical routers of the VRRP router can perform various functions (e.g., electing a master router and inform one another of their functional status). A VRRP circuit may be implemented over a VLAN where all the physical routers (e.g., router 102, and router 104) are communicatively coupled. Each router from the VRRP group is associated with a priority. In some embodiments, these priorities may range from 0 to 255, 255 being the highest priority. In other embodiments, the priorities' range may be different.

At operation 303, each network device from the VRRP group, advertises its associated priority to other network devices of the VRRP group, by transmitting an advertisement message over the VLAN.

At block 304, each network device from the VRRP group receives the priority of each one of the other network devices of the VRRP group through the VLAN. At block 306, the network device (e.g., ND 102) determines whether its priority is highest when compared with the priorities of the other network devices from the VRRP group. In VRRP, the election of a master router is performed based on priorities that have been assigned to each physical router. Thus, upon determination that its priority is the highest, the network device 102 assumes, at block 308, the master role in the VRRP group. At block 310, the network device establishes a multipoint BFD head session indicating that the network device (e.g., ND 102) is acting as a head of a multipoint BFD tree. The BFD tree is associated with the VRRP group, such that the master VRRP network device acts as the BFD head and the backup VRRP network devices act as the BFD tails of the BFD tree. In these embodiments, the BFD session established at the master VRRP network device is identified by the IP address associated with the master router.

At block 312, the network device periodically transmits BFD control packets (the BFD control packets being transmitted over the VLAN over which the VRRP circuit is implemented) to all the tail network devices. These multipoint BFD control packets serve as "heartbeats" informing the tail router (i.e., the backup VRRP routers) that the head router (i.e., the master router of the VRRP group) is functioning properly. The master router uses the IP address associated with the multipoint BFD head session (i.e., the IP address of the master router) as a source IP address when transmitting multipoint BFD session control packets. In addition to transmitting BFD control packets, the master router may also periodically transmit VRRP Advertisement messages to all backup routers on the VRRP circuit (i.e., over the VLAN over which the VRRP circuit is implemented).

Figure 4:
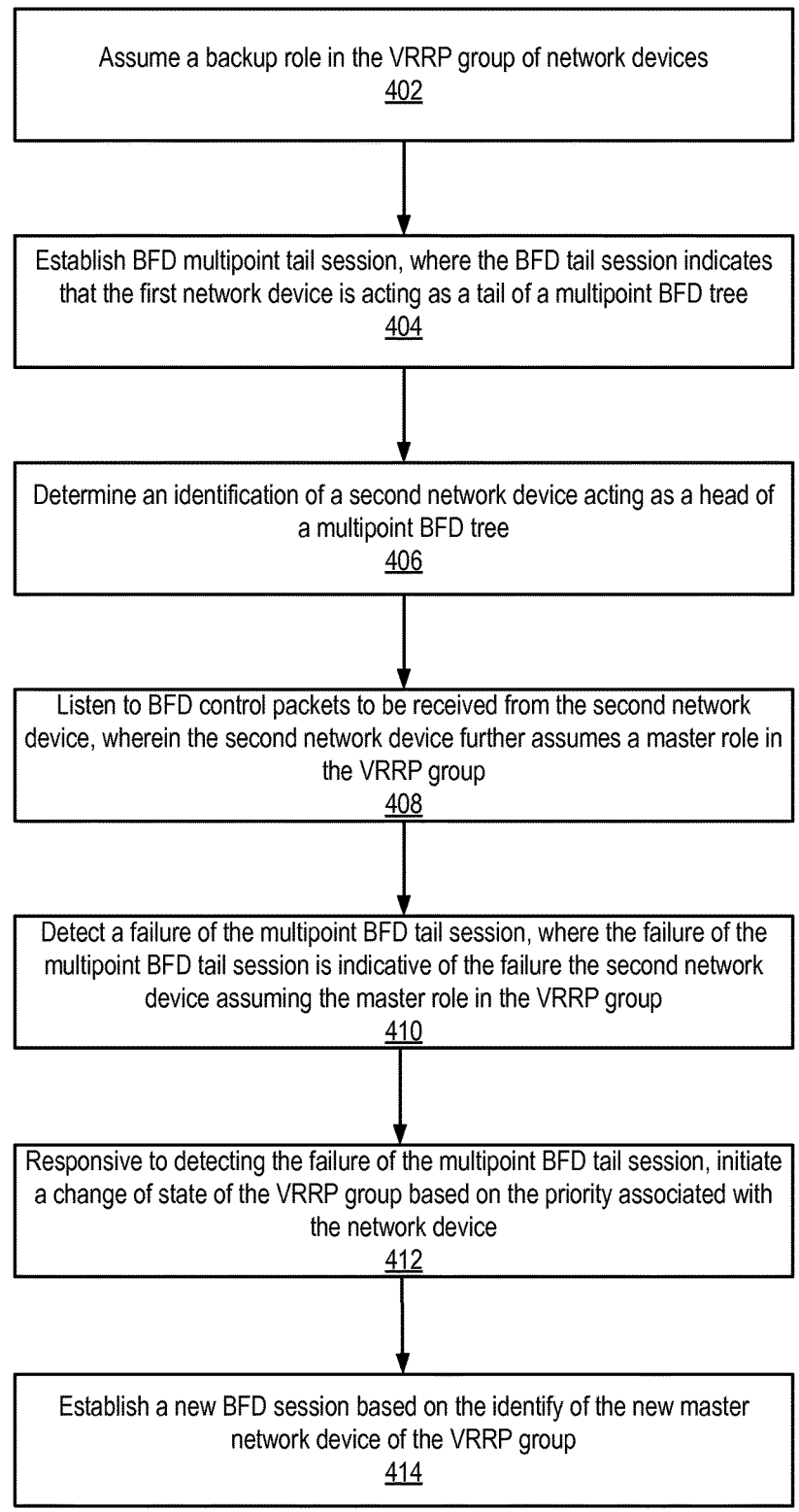
FIG. 4 illustrates a flow diagram of operations performed by a network device being configured to act as a backup network device of a VRRP group in accordance with some embodiments of the invention.

FIG. 4 illustrates a flow diagram of operations performed by a network device being configured to act as a backup network device of a VRRP group in accordance with some embodiments. The operations in FIG. 4 will be described with reference to the exemplary embodiments of FIG. 1. However, it should be understood that the operations of FIG. 4 can be performed by embodiments of the invention other than those discussed with reference to FIG. 1, and the embodiments of the invention discussed with reference to FIG. 1 can perform operations different than those discussed with reference to FIG. 4.

Following the operations 302-306, and upon determination that the priority associated with the network device (e.g., network device 104) is not the highest priority when compared with the priorities of the other network devices (e.g., network devices 102), the operations moves from block 306 to performing the operations 400. At block 402, the network device 104 assumes a backup role in the VRRP group upon determination that it has not the highest priority in the group. As described above with reference to FIG. 2, the role of a backup device is tightly linked to a multipoint BFD session defined for the network devices of the VRRP group. At block 404, the backup network device establishes a BFD multipoint tail session, where the BFD tail session indicates that the network device acts as a tail of a multipoint BFD tree. The BFD tree is associated with the VRRP group, such that the master VRRP network device acts as the BFD head and the backup VRRP network devices act as the BFD tails of the BFD tree.

At block 406, the network device (e.g., ND 104) determines an identification of another network device (e.g., ND 102), where this device acts as the head of a multipoint BFD tree. In some embodiments, this device corresponds to the still active (i.e., which has not yet failed) device with the highest priority in the VRRP group. Following this determination, the backup network device starts listening, at block 408, to BFD control packets to be received from this network device (ND 102). Further the network device also assumes the role of the master router in the VRRP group.

At block 410, the network device 104 detects a failure of its multipoint tail session. The failure of this BFD tail session is indicative of the failure of the network device 102 assuming the master role in the VRRP group. In some embodiments, the VRRP group includes more than one backup network device and each one of them detects a failure of their associated BFD tail session which are rooted at the failed master network device 102.

At block 412, responsive to detecting the failure of the multipoint BFD tail session, initiating a change of state of the VRRP group based on the priority associated with the network devices from the VRRP group. The change of state includes the determination of a new master network device for the VRRP group different from the failed master network device. For example as illustrated in FIG. 1 and according to some embodiments, upon detection of the failure of the multipoint BFD tail session at the network device 104, the network device switches to becoming the master network device of the VRRP group. In some of these embodiments, the network device 104 assumes the master role as it has the highest priority in the VRRP groups. In other embodiments, another network device (not illustrated) may switch to becoming the master network device as this device also detects the failure of its BFD tail session associated with the original network device 102 and as this device may be the one with the highest priority in the VRRP group. In the embodiments, where the VRRP group includes more than one backup network device, upon failure of the master network device, only one network device assumes the new role of master in the group. The other network devices remain backup devices.

At block 412, the network device 104 establishes a new BFD session based on the identity of the new master network device of the VRRP group. Upon determination of the new VRRP master network device, each one of the network devices of the VRRP group reestablishes a BFD session associated with the new master VRRP network device. For example, when the new master VRRP device is ND 104, the ND 104 establishes a multipoint BFD head session it periodically transmits BFD control packets (the BFD control packets being transmitted over the VLAN over which the VRRP circuit is implemented) to all the tail network devices. As described with reference to block 312 of FIG. 3, these multipoint BFD control packets serve as "heartbeats" informing the tail router (i.e., the backup VRRP routers) that the head router (i.e., the master router of the VRRP group) is functioning properly. The master router uses the IP address associated with the multipoint BFD head session (i.e., the IP address of the master router) as a source IP address when transmitting multipoint BFD session control packets.

Further the backup network devices of the VRRP group (which may include the previous master router) establish BFD tail sessions enabling the devices to listen to BFD control packets sent from the new master network device. Thus the backup network devices of the VRRP group are updated to listen to BFD control packets identified by the IP address of the new master VRRP device.

The embodiments provides methods and apparatuses for enabling detection of a network device acting as a master of a VRRP group by using multipoint bidirectional forwarding detection.

As described herein, operations performed by the network devices (e.g., routers) may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. The software 520 is a VRRP multipoint bidirectional forwarding detection (BFD) module and is operative to implement operations as described with reference to FIG. 1-4. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. The software 550 is a VRRP multipoint bidirectional forwarding detection (BFD) module and is operative to implement operations as described with reference to FIG. 1-4. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 5C:
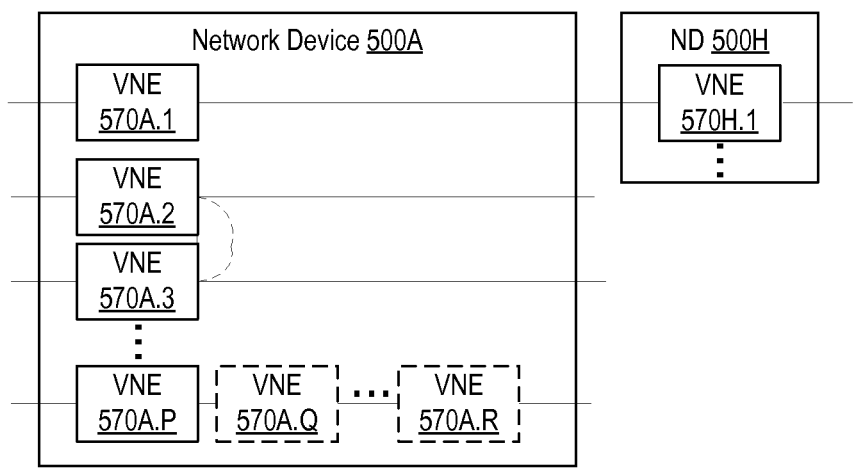
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first network device of enabling detection of a failure of a network device acting as a master of a virtual router redundancy protocol (VRRP) group of network devices, the method comprising:
  determining whether a first priority associated with the first network device from the VRRP group is a highest priority when it is compared with priorities respectively associated with other network devices from the VRRP group; and
  responsive to determining that the first priority associated with the first network device is the highest priority, performing the following:
    causing the first network device to assume a master role in the VRRP group, and
    establishing a multipoint bidirectional forwarding detection (BFD) head session, wherein the multipoint BFD head session indicates that the first network device is acting as a head of a multipoint BFD tree, and the other network devices of the VRRP group act as tails of the multipoint BFD tree;
  responsive to determining that the first priority associated with the first network device is not the highest priority, performing the following:
    causing the first network device to assume a backup role in the VRRP group, and
    establishing a multipoint BFD tail session, wherein the multipoint BFD tail session indicates that the first network device is configured to act as a tail of the multipoint BFD tree,
    listening to BFD control packets to be received from a second network device, wherein the second network device acts as a head of the multipoint BFD tree and further assumes a master role in the VRRP group,
    detecting a failure of the multipoint BFD tail session, wherein the failure of the multipoint BFD tail session is indicative of the failure of the second network device which assumes the master role in the VRRP group; and
    responsive to detecting the failure of the multipoint BFD tail session, initiating a change of state of the VRRP group based on priorities associated with the network devices from the VRRP group, and wherein the change of state includes the determination of an identity of a new master network device for the VRRP group different from the second network device.

2. The method of claim 1, further comprising, following the establishing the multipoint BFD head session, periodically transmitting multipoint BFD control packets to be received by the other devices of the VRRP group, wherein the other network devices act as VRRP backup network devices.

3. The method of claim 2, wherein the multipoint BFD control packets include an IP address of the first network device as a source address.

4. The method of claim 1, wherein responsive to determining that the first priority associated with the first network device is not the highest priority, further performing the following:
  determining an identification of the second network device.

5. The method of claim 4, further comprising following the initiation of the change of state of the VRRP group, establishing a new BFD session based on the identity of the new master network device of the VRRP group.

6. A first network device to enable detection of a failure of a network device acting as a master of a virtual router redundancy protocol (VRRP) group of network devices, the first network device comprising:
- a non-transitory machine-readable storage medium configured to store a VRRP multipoint bidirectional forwarding detection (BFD) module; and
- a network processor communicatively coupled to the non-transitory machine-readable storage medium, the network processor operative to execute the VRRP multipoint BFD module, the VRRP multipoint BFD module operative to,
  - determine whether a first priority associated with the first network device is a highest priority when it is compared with priorities respectively associated with other network devices of the VRRP group,
  - responsive to determining that the first priority associated with the first network device is the highest priority, the VRRP multipoint BFD module is further operative to,
    - cause the first network device to assume a master role in the VRRP group, and
    - establish a multipoint bidirectional forwarding detection (BFD) head session, wherein the multipoint BFD head session indicates that the first network device is acting as a head of a multipoint BFD tree, and the other network devices of the VRRP group act as tails of the multipoint BFD tree;
  - responsive to determining that the first priority associated with the first network device is not the highest priority, the VRRP multipoint BFD module is further operative to:
    - cause the first network device to assume a backup role in the VRRP group, and
    - establish a multipoint BFD tail session, wherein the multipoint BFD tail session indicates that the first network device is configured to act as a tail of the multipoint BFD tree,
    - listen to BFD control packets to be received from a second network device, wherein the second network device acts as a head of the multipoint BFD tree and further assumes a master role in the VRRP group,
    - detect a failure of the multipoint BFD tail session, wherein the failure of the multipoint BFD tail session is indicative of the failure of the second network device which assumes the master role in the VRRP group; and
    - responsive to detecting the failure of the multipoint BFD tail session, initiate a change of state of the VRRP group based on priorities associated with the network devices from the VRRP group, and wherein the change of state includes the determination of an identity of a new master network device for the VRRP group different from the second network device.

7. The first network device of claim 6, wherein the VRRP multipoint BFD module is further operative to periodically transmit multipoint BFD control packets to be received by the other devices of the VRRP group, wherein the other network devices act as VRRP backup network devices.

8. The first network device of claim 7, wherein the multipoint BFD control packets include an IP address of the first network device as a source address.

9. The first network device of claim 6, wherein responsive to determining that the first priority associated with the network device is not the highest priority, the VRRP multipoint BFD module is further operative to:
- determine an identification of the second network device.

10. The first network device of claim 9, wherein the VRRP multipoint BFD module is further operative to establish, following the initiation of the change of state of the VRRP group, a new BFD session based on the identity of the new master network device of the VRRP group.

11. A non-transitory computer-readable storage medium having computer code stored therein, which when executed by a processor of a first network device for enabling detection of a failure of a network device acting as a master of a virtual router redundancy protocol (VRRP) group of network devices, cause the first network device to perform operations comprising:
- determining whether a first priority associated with the first network device from the VRRP group is a highest priority when it is compared with priorities respectively associated with other network devices from the VRRP group; and
- responsive to determining that the first priority associated with the first network device is the highest priority, performing the following:
  - causing the first network device to assume a master role in the VRRP group, and
  - establishing a multipoint bidirectional forwarding detection (BFD) head session, wherein the multipoint BFD head session indicates that the first network device is acting as a head of a multipoint BFD tree, and the other network devices of the VRRP group act as tails of the multipoint BFD tree;
- responsive to determining that the first priority associated with the first network device is not the highest priority, performing the following:
  - causing the first network device to assume a backup role in the VRRP group, and
  - establishing a multipoint BFD tail session, wherein the multipoint BFD tail session indicates that the first network device is configured to act as a tail of the multipoint BFD tree,
  - listening to BFD control packets to be received from a second network device, wherein the second network device acts as a head of the multipoint BFD tree and further assumes a master role in the VRRP group,
  - detecting a failure of the multipoint BFD tail session, wherein the failure of the multipoint BFD tail session is indicative of the failure of the second network device which assumes the master role in the VRRP group; and
  - responsive to detecting the failure of the multipoint BFD tail session, initiating a change of state of the VRRP group based on priorities associated with the network devices from the VRRP group, and wherein the change of state includes the determination of an identity of a new master network device for the VRRP group different from the second network device.

12. The non-transitory computer-readable storage medium of claim 11, wherein the operations further comprise, following the establishing the multipoint BFD head session, periodically transmitting multipoint BFD control packets to be received by the other devices of the VRRP group, wherein the other network devices act as VRRP backup network devices.

13. The non-transitory computer-readable storage medium of claim 12, wherein the multipoint BFD control packets include an IP address of the first network device as a source address.

14. The non-transitory computer-readable storage medium of claim 11, wherein the operations further comprise:
   determining an identification of the second network device.

15. The non-transitory computer-readable storage medium of claim 11, wherein the operations further comprise following the initiation of the change of state of the VRRP group, establishing a new BFD session based on the identity of the new master network device of the VRRP group.

\* \* \* \* \*